United States Patent
Woodward

(10) Patent No.: US 8,499,783 B2
(45) Date of Patent: Aug. 6, 2013

(54) GATE VALVE WITH SEALS

(75) Inventor: Peter John Woodward, Bournemouth (GB)

(73) Assignee: Innovative Pipesystems Limited, Wimborne, Dorset (GB)

( * ) Notice: Subject to any disclaimer, the term of this patent is extended or adjusted under 35 U.S.C. 154(b) by 104 days.

(21) Appl. No.: 12/864,865

(22) PCT Filed: Jan. 29, 2009

(86) PCT No.: PCT/GB2009/000247
§ 371 (c)(1),
(2), (4) Date: Jul. 27, 2010

(87) PCT Pub. No.: WO2009/095669
PCT Pub. Date: Aug. 6, 2009

(65) Prior Publication Data
US 2010/0308252 A1  Dec. 9, 2010

(30) Foreign Application Priority Data

Jan. 29, 2008 (GB) .................................. 0801562.0

(51) Int. Cl.
*F16K 3/02* (2006.01)
(52) U.S. Cl.
USPC ............................ 137/375; 251/327; 277/649
(58) Field of Classification Search
USPC .. 251/326–329, 334; 137/375; 277/648–649
See application file for complete search history.

(56) References Cited

U.S. PATENT DOCUMENTS

| 1,645,785 | A | * | 10/1927 | Wilson | 251/203 |
| 2,194,261 | A | * | 3/1940 | Allen | 251/328 |
| 3,295,546 | A | | 1/1967 | Carlton | |
| 3,398,926 | A | * | 8/1968 | Scaramucci | 251/172 |
| 3,508,573 | A | * | 4/1970 | Smith | 137/375 |
| 4,541,613 | A | * | 9/1985 | Barbe | 251/326 |
| 4,629,160 | A | * | 12/1986 | David | 251/327 |

(Continued)

FOREIGN PATENT DOCUMENTS

| DE | 1808175 A1 | 10/1969 |
| DE | 8704118 U1 | 4/1987 |

OTHER PUBLICATIONS

International Preliminary Report on Patentability and Written Opinion of the International Searching Authority, mailed Aug. 3, 2010, for corresponding International Application No. PCT/GB2009/000247, 6 pages.

(Continued)

*Primary Examiner* — John Bastianelli
(74) *Attorney, Agent, or Firm* — Klarquist Sparkman, LLP

(57) ABSTRACT

A gate valve for mounting in a pipeline comprises a valve body and a gate mounted in the valve body so as to be movable between an open position, and a closed position where a valve opening formed in the valve body is closed by the gate. The gate comprises two opposed faces spaced from the transverse plane of the gate, at least one face being provided with at least two seals that each extend around the face one seal being located within the periphery of the other such that both seals, when the gate is in the closed position, seal against a seat of the valve body to seal against the pressure of fluid acting on the gate in use. In one embodiment, a gate has four seals in total, two on the upstream gate face and two on the downstream gate face.

18 Claims, 4 Drawing Sheets

U.S. PATENT DOCUMENTS

| | | | |
|---|---|---|---|
| 5,013,007 A | | 5/1991 | Whiteside |
| 5,013,009 A | * | 5/1991 | Nelson .......................... 251/357 |
| 6,089,543 A | * | 7/2000 | Freerks ......................... 251/357 |
| 6,629,682 B2 | * | 10/2003 | Duelli ........................... 251/158 |
| 6,726,178 B2 | | 4/2004 | Grandage |
| 6,764,265 B2 | * | 7/2004 | Kunze et al. .................. 251/193 |
| 7,011,294 B1 | * | 3/2006 | Ehrne et al. .................. 251/328 |
| 7,017,886 B1 | | 3/2006 | Ngene-Igwe |
| 2002/0088959 A1 | | 7/2002 | Duelli |
| 2003/0155545 A1 | | 8/2003 | Grandage |

OTHER PUBLICATIONS

International Search Report of the International Searching Authority, mailed May 28, 2009, for corresponding International Application No. PCT/GB2009/000247.

Notification of the Second Office Action, issued Oct. 18, 2012, by the State Intellectual Property Office of the People's Republic of China, for corresponding patent application No. 200980111403.0, 2 pp.

* cited by examiner

GATE VALVE WITH SEALS

CROSS REFERENCE TO RELATED APPLICATIONS

This is the U.S. National Stage of International Application No. PCT/GB2009/000247, filed Jan. 29, 2009, which in turn claims the benefit of Great Britain Application No. GB0801562.0, filed Jan. 29, 2008.

The present invention relates to a gate valve and particularly but not exclusively relates to a gate valve for use as a pipeline isolating valve on non-domestic mains gas or water supply pipelines.

Historically there has been considerable inertia in the field of gate valves such that the design of such valves has not changed significantly.

An established form of gate valve is the wedge gate valve wherein the gate comprises a wedge having two opposed inclined planar metal faces that each seal against part of a metal valve seat of the gate valve body. It is necessary to have machined both the metal faces of the gate and the corresponding surfaces of the valve seat to ensure a sufficient seal. Nonetheless, it is still typically difficult to ensure a liquid or gas tight seal with such a valve, not least because of production tolerances, and deposits that may have built up on the gate faces and valve seat.

Leakage of such a valve may be minimised by recessing an o-ring in each of the metal faces but this can add to the expense of such a valve because of the machining requirements during manufacture.

Additionally such valves typically have a recess at the base of the valve body which is designed to receive the tip of the wedge shaped gate. This recess can fill with debris which impedes full gate closure.

A development on the wedge gate valve is the resilient seated wedge gate valve wherein the wedge shaped gate is coated with or possibly formed from, a resiliently deformable material such as a rubber material. This resiliently deformable material seals against the valve seat cast in the valve body and can adapt to some extent to imperfections in the profile of the valve seat, and in the gate valve itself, thus providing an improved seal as long as sufficient compression of the resilient material is maintained. Such a valve eliminates the machining requirements of the gate and valve body during manufacture. Such valves also typically dispense with the recess at the base of the valve body and so the problem of accumulated debris in the recess is avoided.

Nonetheless it can be difficult to ensure a constant seal is achieved around the entire periphery of the valve seat, not least because of the different sealing material thicknesses that are used on different parts of the gate, particularly at the transition between the upper wedge shaped part of the gate, and a lower part of the gate.

A development of such a resilient wedge gate valve is provided by U.S. Pat. No. 6,726,178 B2 which describes a gate seal wherein the geometry of the sealing material on the gate is such that the compression of all parts of the seal is substantially constant.

However, the resilient wedge gate valve disclosed in this patent suffers from a disadvantage common to all such valves wherein the pressure of fluid acting on the gate acts to push the gate in the direction of the applied pressure. Such movement can be restricted to an extent by the provision of suitable guide surfaces between the gate and the seat, but cannot be entirely eliminated.

It has previously been proposed to service a particular section of pipeline, such as a gas supply pipeline, using a so called 'double block and bleed' process. One way to achieve this is to use a metal seated valve with an o-ring let into each sealing face. With the valve closed the internal valve body space can be vented and purged of gas. The internal body space can be provided with a sensor that detects any gas leaking into the internal body space. Where a resilient wedge gate valve is used for a double block and bleed process, such a valve typically only has a single sealing face and so two adjacent valves are required in the pipeline, both of which are closed. The pipeline on one side of one valve is depressurised to enable work to be carried out on the pipeline on that side of the valve. As a safety precaution the inter-valve space between the two valves is also depressurised and is provided with a gas sensor. Should gas leak through the valve on the pressurised side of the pipeline, this gas will enter the inter-valve space and the sensor will trigger an alarm. The inter-valve space is vented and purged to prevent the build up of any gas. This procedure is costly because of the requirement of two valves, and the associated installation cost, space and access requirements. It is possible to use resilient wedge gate valves having two sealing faces, but then the issue of reduced compression on the upstream face is a significant problem.

The result of the movement of the valve gate as described above is that the compression on the downstream sealing surfaces of the gate is increased but compression on the upstream sealing surfaces is decreased, resulting in a reduced sealing capability on the upstream gate face. This is disadvantageous particularly when attempting to carry out a double block and bleed type operation.

The extent of the problem depends on the size of the valve, and the magnitude of the fluid pressure in the pipeline, but tends to be more of a problem with larger valves. This is partly due to the casting tolerances used to manufacture the valve body, which is usually an unmachined casting, where, for larger valves, the tolerances will result in larger variations in the valve body dimensions that, if near their limit, may result in the upstream sealing surfaces being insufficiently compressed that they cannot seal against a fluid pressure required by industry or health and safety standards.

According to a first aspect of the invention there is provided a gate valve for mounting in a pipeline, the gate valve comprising a valve body and a gate mounted in the valve body so as to be movable between an open position, and a closed position where a valve opening formed in the valve body is closed by the gate, the gate comprising two opposed faces spaced from the transverse plane of the gate, at least one face being provided with at least two seals that each extend around the face, one seal being located within the periphery of the other such that both seals, when the gate is in the closed position, seal against a seat of the valve body to seal the valve opening against the pressure of fluid acting on the gate in use.

Preferably each face comprises at least two seals.

The or each face may comprise more than two seals.

One face may comprise an equal or unequal number of seals to the other face.

It is envisaged that multiple seals can be provided on one face with only one seal being provided on the other face.

The seals may be integrally formed with the gate such that the gate and seals are formed of the same material.

Alternatively the gate may comprise a core of one material, the seals being coated or moulded onto the core using another material.

The seals may be of curved profile. The seals may be of semi circular profile.

Alternatively or additionally the seals may be of angular profile. The seals may be at least one of triangular, rectangular, square or trapezoidal profile.

The gate may be wedge shaped when viewed from the side, that is, in a direction aligned with the plane of the valve opening.

The gate may have parallel, planar sealing faces when viewed from the side, that is, in a direction aligned with the plane of the valve opening.

According to a second aspect of the invention there is provided a gate for mounting in a valve body of a gate valve, the gate comprising two opposed faces spaced from the transverse plane of the gate, at least one face being provided with at least two seals that each extend around the face one seal being located within the periphery of the other.

Other aspects of the present invention may include any combination of the features or limitations referred to herein.

The present invention may be carried into practice in various ways, but embodiments will now be described by way of example only with reference to the accompanying drawings in which.

Figure 1:
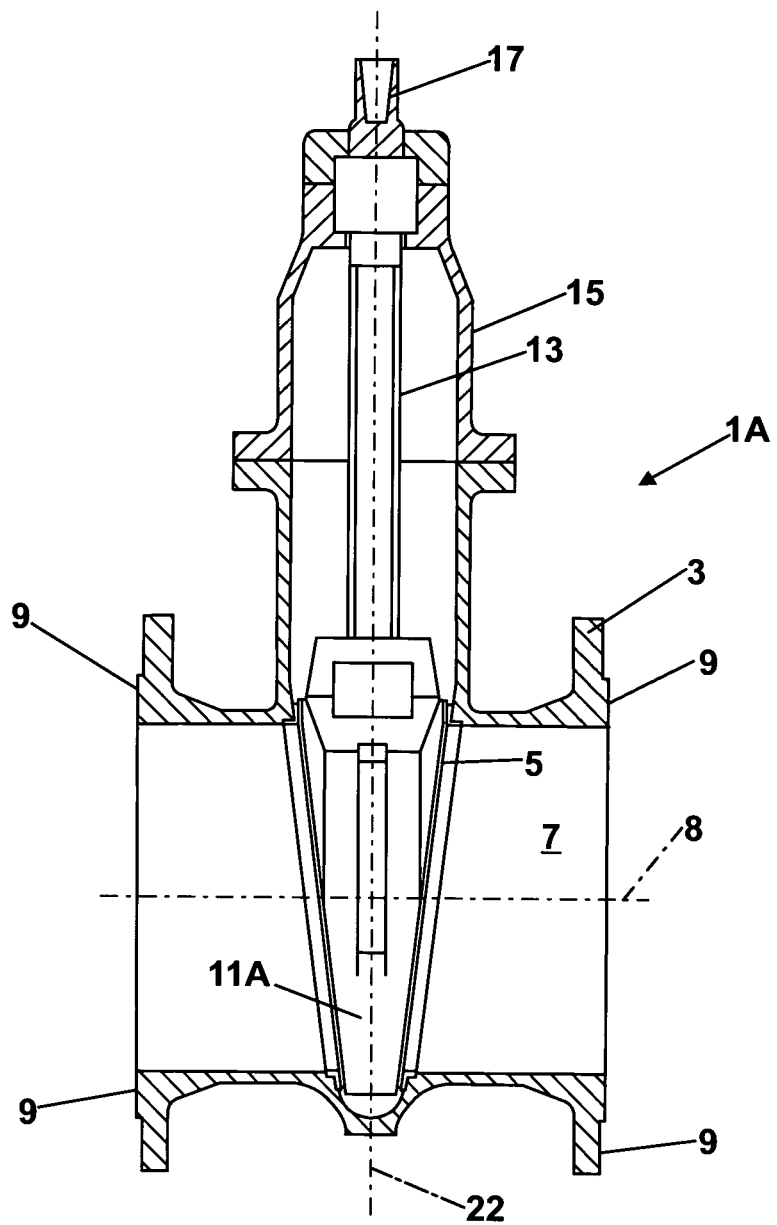
FIG. 1 is a sectional side view of a prior art metal wedge gate valve.

Referring initially to FIG. 1, a prior art gate valve 1A comprises a valve body 3, the lower part of which comprises a valve seat 5 formed with a valve opening in the form of through bore 7. The regions that surround the ends of the bore 7 comprise mating surfaces 9 to sealingly mate with respective ends of a pipeline (not shown).

The valve 1A further comprises a valve gate 11A arranged to be movable vertically into and out of the bore 7 in a direction orthogonal to the longitudinal axis 8 of the bore 7 so as to close, partially close, or open the bore 7. The valve gate 11A is movable by way of a valve stem 13 that, in this example, comprises a threaded stem that extends from the gate 11A, up through an upper part 15 of the valve body 3 and terminates in a formation 17 that projects from the top of the upper part 15 of the valve body 3. The formation 17 in use can be engaged by a suitable tool, such as a valve operating key, that is used to rotate the threaded stem and so raise or lower the gate 11A. The formation 17 may be connected to a motorised actuator (not shown) such that the gate 11A can be raised or lowered remotely by controlling the actuator.

The valve gate 11A in this example is a metal wedge shaped gate that seals against the valve seat 5 in the valve body 3, the seal being provided by the metal of the gate 11 engaging with the metal of the valve seat 5.

Figure 2:
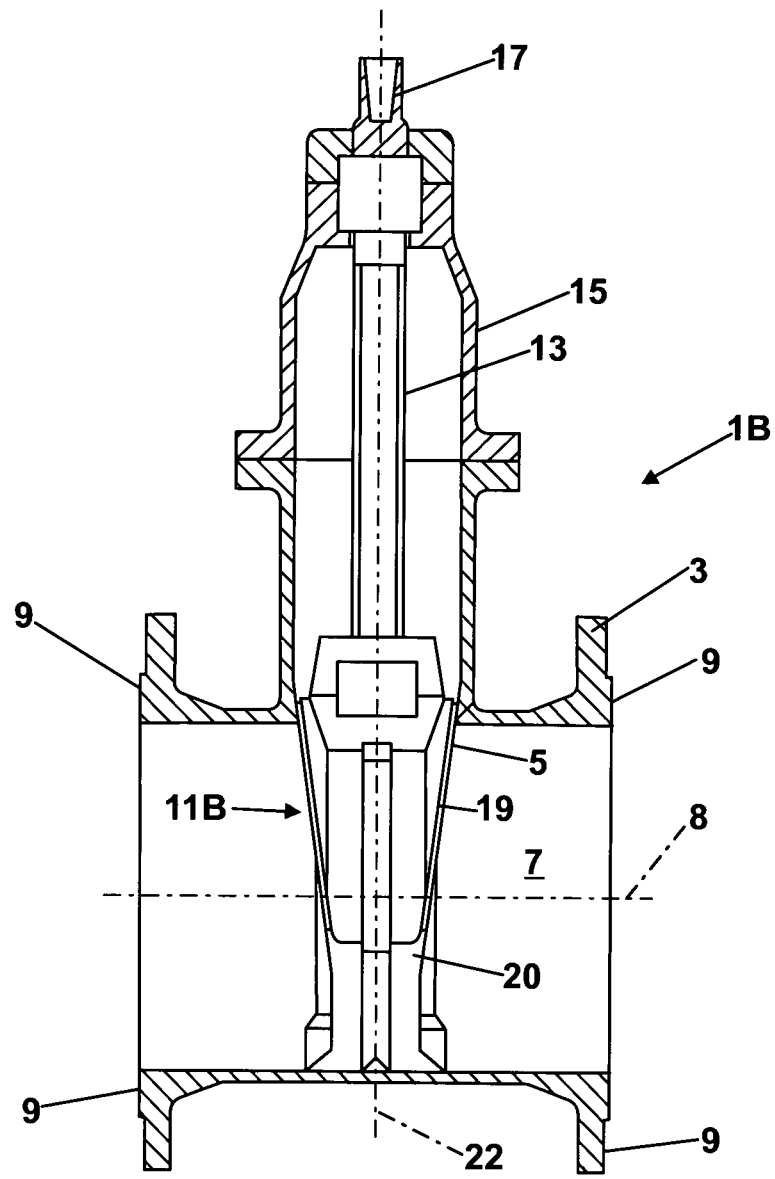
FIG. 2 is a sectional side view of a general prior art resilient seated wedge gate valve.

Referring to FIG. 2, another prior art gate valve 1B is of generally similar constructions to the valve 1A described above except that the valve 1B is provided with a gate 11B comprising, when viewed from the side, a wedge shaped portion 19 that leads to a shoulder 20. The outermost opposed faces of the gate 11B, that is the faces furthest to the left and to the right of FIG. 2, are spaced apart from a transverse plane 22 of the gate 11B, each comprise a resilient seal that extends across the top of the gate 11B, and down the wedge shaped portion 19. The resilient seals then extend around the shoulder 20 of the gate 11 and meet at the lower apex of the gate 11B.

Figure 3:
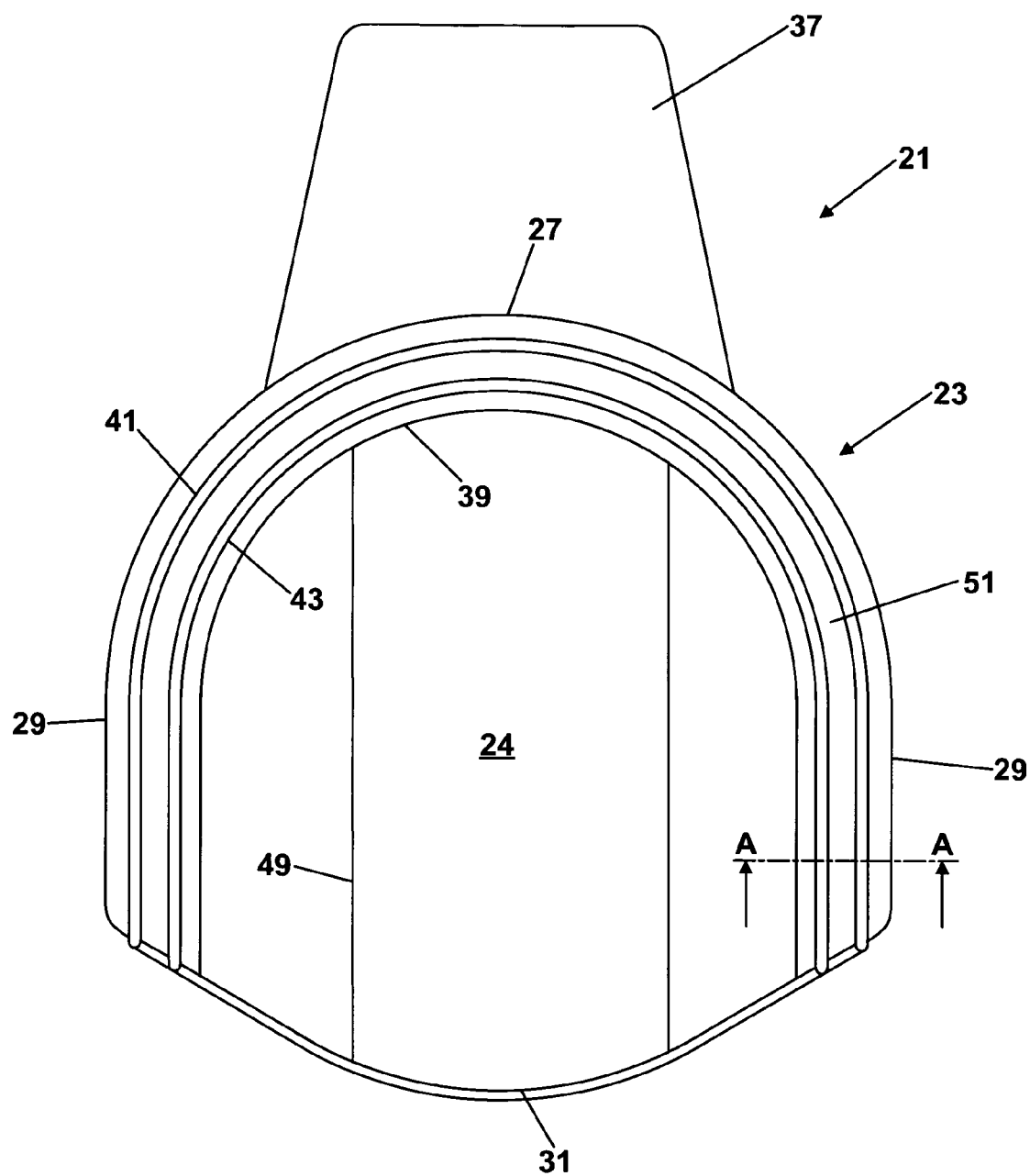
FIG. 3 is a front view of a gate comprising part of a gate valve in accordance with the present invention.
Figure 4:
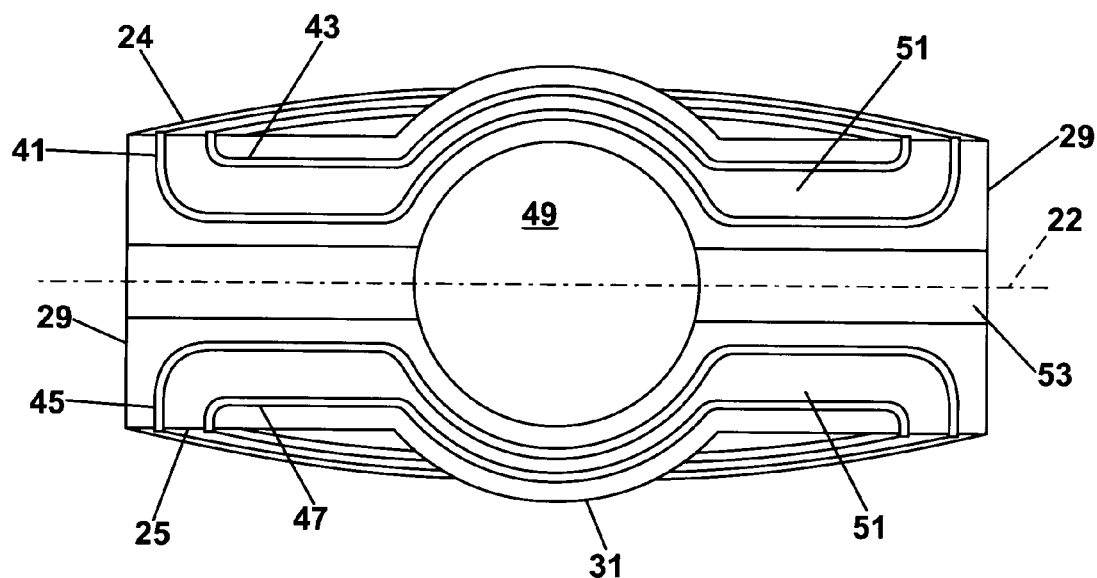
FIG. 4 is a view from underneath of the gate of FIG. 3.
Figure 5:
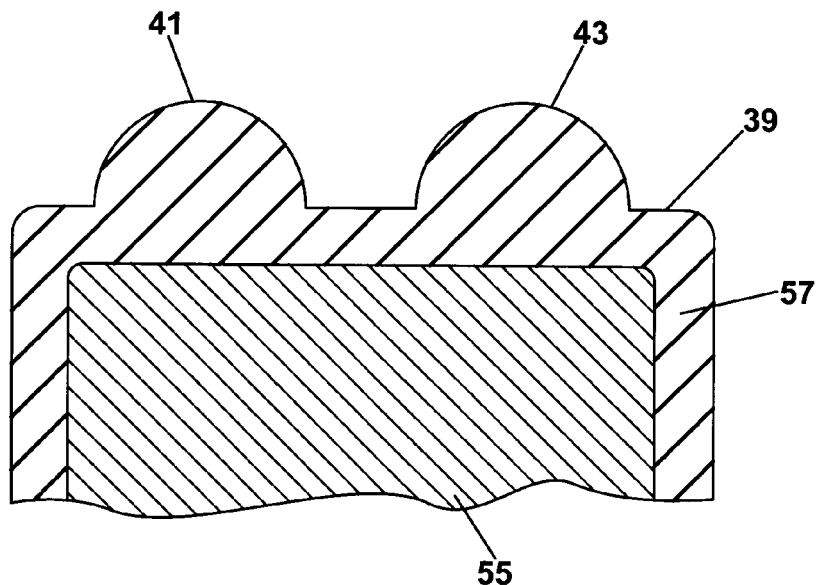
FIG. 5 is a sectional view taken on line A-A of FIG. 3.

Referring now to FIGS. 3 to 5, a valve gate 21 in accordance with the present invention comprises a gate body 23 having an opposed front and rear (or upstream and downstream in use) faces 24, 25 spaced from the transverse plane 22 of the gate 21. The upper periphery 27 of each face 24, 25 is semi circular when viewed from the front or rear. The upper periphery 27 leads to two downwardly extending parallel sides 29 that each terminate in an inclined curved base 31. A boss 37 is formed at the top of the gate 21 and is adapted to engage with, a valve stem as described above with reference to FIG. 1, as is well known.

The outer margin of each face 24, 25 is formed with a strip 39 that extends up from the base of the gate 21 in a horse-shoe or 'n' shape that follows the outer margin of the face 24, 25. The top of the strip 39 projects further from the transverse plane 22 of the gate 21 than the bottom of the horse shoe strip 39, such that at least the upper part of the gate 21 is substantially wedge shaped when the gate 21 is viewed in transverse cross section, that is, in a direction aligned with the plane 22.

The strip 39 on face 24 is provided with two, substantially parallel, seals 41, 43 that extend around the entire length of the strip 39 one seal 43 being located within the periphery of the other 41. The seals 41, 43, when they reach the curved base 31 of the gate 21, curve underneath the gate 21, bend through 90° and extend transversely across the base 31 of the gate 21, before bending through 90° again so as to extend up the other side of the strip 39 on the same face 24.

An identical set of concentric seals 45, 47 are provided on the opposed face 25 of the gate 21.

With particular reference to FIG. 4, the base of the gate 21 comprises an enlarged central circular region 49 which may surround or comprise a bore in which the actuator rod 13 is received. The enlarged central circular region 49 extends to some extent up each face 24, 25 so as to define a cylindrical formation. Each pair of seals 41, 43 and 45, 47, at the base 31 of the gate 21, curve around the circular region 45 and the interseal space between the seals 41 to 47 in each pair is reduced at that part, in this example, although the seals in each pair may remain equispaced along their entire length.

The seals 41 to 45 are each thus continuous so as to be formed without any breaks or gaps. The seals 41, 43 extend across the top and down one side of one face 24, underneath and across the base 31, and back up the other side of the same face 24. The seals 45, 47 do the opposite on the opposed face 25.

It will therefore be appreciated that the gate 21 is provided with four seals, arranged in two pairs, one on each sealing face 24, 25. There is an inter-seal space 51 thus defined between each pair of seals, 41, 43 and 45, 47.

With reference to FIG. 5, an example of the profile of the seals 41, 43 is semicircular. However, any other desired profile of seals 41, 43 may be used alternatively or additionally, and such profiles include triangular, rectangular, square or trapezoidal, or any combination of these. It is envisaged for one of the seals in each pair to have a different profile to the other seal 43. It is also envisaged that the profile of one or each seal could vary along its length.

The part of the seals 41 to 47 that extend across the base 31 of the gate 21 act as in-line seals, that is the upstream fluid pressure acts generally in line with the direction of fluid flow and the longitudinal axis of the valve bore 7. The part of the seals 41 to 47 that are on each face 24, 25 of the gate 21 act as radial seals, that is, the upstream pressure acts generally radially to the direction of fluid flow and the longitudinal axis of the valve bore 7.

The valve 1 may in use be closed when fluid is flowing through the bore 7. As the valve 1 is closed, the parts of the seals 41 to 47 on the upper part of the strip 29 of the gate 21 are the first to come into contact with the sealing faces on the seat 5 of the valve body 3.

When the valve 1 is almost closed, that is when the base 31 of the gate 21 is almost in contact with the base of the bore 7 in the valve body 3, the seals 41 to 47 in each pair are in contact with the valve seat 5 over most of their length. The fluid flow passes across a small length of each seal 41 to 47 that is not yet in contact with the seat.

As the gate 21 is moved towards the closed position, the fluid pressure will drop in steps, so that the pressure between the seals 41, 43 and the seals 45, 47 will be intermediate between the upstream and downstream fluid pressure.

When the gate 21 reaches the fully closed position, the intermediate fluid pressure will be trapped between the two seals 41, 43 of the upstream pair. The first seal 41 will experience a pressure drop from the upstream pressure down to the mid-pressure and the second seal 43 will experience a pressure drop from the mid-pressure down to the pressure downstream of that seal.

Thus a valve required to seal against for example eight bar on the upstream face 24 when the bore 7 in the valve body 3 is vented to atmosphere, but which because of the valve size might previously have been capable of sealing only against four bar, has a pressure drop of only approximately four bar across each seal 41, 43, so as to seal successfully against the eight bar pressure. Similarly a valve previously limited to sealing against eight bar on the upstream face could with the two upstream face seals 41, 43 achieve sealing against approximately sixteen bar.

The gate 21 may be closed when fluid is not flowing through the valve bore 7. When in the closed position, fluid pressure is applied to the upstream face 24 of the valve gate 21. When the pressure reaches the limit of the first seal 41, say for example four bar, leakage will go past the first seal 41 and if there was no second seal 43, the leakage would go straight into the downstream part of the valve bore 7. However, the second seal 43 of the first pair of seals resists leakage past it and so the leakage past the first seal 41 will start to pressurise the interseal space 51 between the two seals 41, 43. The upstream pressure will continue to rise, maintaining a pressure difference of approximately four bar from upstream to interseal space 51. When the upstream pressure reaches the full required, say for example eight bar, the pressure in the interseal space 51 will be approximately four bar. Since the second seal 43 is also capable of holding approximately four bar, there will be no leakage past the second seal 43.

On applications such as water service or gas supply isolation where a double block and bleed feature is not required, the four seals 41 to 47 (two upstream and two downstream) would all come into operation, effectively breaking the upstream pressure down across all four seals 41 to 47.

The use of more than one seal on each sealing face 24, 25 of the valve gate 21 also enables the second seal of each face 24, 25 to function as a back-up seal if the first seal should fail due to wear and tear, mechanical damage or deposit build up of any kind on the seat 5 of the valve body 3, effectively providing at least four seal security.

A valve 1 in accordance with the present invention may be particularly beneficial in a double block and bleed operation wherein only a single valve is required because the space 53 between the two pairs of seals 41 to 47, that is between the two sealing faces 24, 25 can incorporate the sensor to detect the presence of fluid leakage through the upstream pair of seals 41, 43. Any fluid leakage into the space 53 is vented and purged in use. The provision of two seals 41, 43 upstream of the space 53 provides a greatly enhanced sealing against the upstream fluid pressure.

A further advantage is that the resilient seals 41 to 47 may be produced by a moulding process, such that the unit cost of production is no different from the cost of a wedge gate with only one seal per face.

To some extent it may be possible to force a valve to seal against a higher fluid pressure, by applying a higher torque to the valve stem 13, that is, to effectively increase compression of the seals. In such circumstances a valve having at least two seals on at least one face 24, 25, in accordance with the invention, would be able to seal with a normal amount of closing torque. In the limited size range where prior art valves with a single seal on each face are able to achieve successful double block and bleed service, valves with a double seal on each face would be able to achieve the same result with a lower operating torque.

So a valve with at least a double seal on at least one sealing face of the gate would require a lower final closing torque than a valve with a single seal on each face.

Lower torque applied to the valve stem will also generate lower mechanical forces, reducing the risk of mechanical failure in the valve, which is particularly advantageous and less hazardous in gas valve applications.

Lower torque applied to the valve stem is also advantageous from a Health and Safety point of view because it reduces the risk of operator back injuries on manually operated valves in the gas, water and other industries.

Lower torque is also advantageous where the valve gate is power operated, since a smaller and more cost effective actuator can be used.

It will be appreciated from the above that, more than two seals may be provided on each sealing face 24, 25 if required, and the advantages described above will be amplified. For example it is envisaged that three, four, five or more seals could be provided on one or each sealing face 24, 25.

The seals 41 to 47 are formed from a resiliently deformable material which may be an elastomeric material such as a rubber or plastics based material. The entire gate 21, including seals 41 to 47 may be made entirely from such a material, or the gate 21 may, with reference to FIG. 4, comprise a core 55 made from a more rigid material such as metal, overlaid with a resiliently deformable material 57 which would usually be bonded to the underlying material.

The above described valve 1 and gate 21 could be used on any domestic, commercial or infrastructure fluid pipeline.

The valve described above could, for example be used with bore 7 sizes in the range of 50 to 300 mm, or adapted to be connected to pipework in the diameter range two to twelve inches, as well as larger sizes.

The gate 21 has been described above as being generally wedge shaped when viewed along the transverse gate plane 22, but it is envisaged that the multiple seal arrangement described could be used on a gate of any other desired shape including a gate wherein the sealing faces 24, 25 are planar and parallel or only slightly inclined. The gate 21 therefore may, for example, have one or more conical or frustroconical portions. The gate 21 may be substantially hour glass shaped when viewed along the transverse plane 22.

Additionally the profile of the gate 21 when viewed from the front or rear can be of any suitable shape as required, and may, for example, be elliptical or oval.

The gate valve may be of parallel slide valve type comprising a metal faced gate with parallel sealing faces that are biased, by a spring or the like, into sealing engagement with the valve body.

The invention claimed is:

1. A gate for mounting in a valve body of a resilient seated gate valve, the gate being coated with, or formed from, a resiliently deformable material and comprising two opposed faces spaced from the transverse plane of the gate, at least the upstream face being provided with at least two seals formed from the resiliently deformable material, that each extend around the face, the at least two seals comprising a first upstream seal and a second upstream seal, the first upstream seal being located within the periphery of the second upstream seal, the first upstream seal, in use, permitting fluid leakage when it reaches the limit of its sealing capability for a given compression such that an inter-seal space between the two seals becomes pressurised so that the fluid pressure is stepped and retained across the seals, that is, the fluid pressure between the seals is intermediate the upstream fluid pressure and the downstream fluid pressure, wherein at least four seals are provided, that is, the upstream and the downstream faces each comprise at least two seals, such that in use, the seal compression forces required to seal against a given fluid pressure are further reduced, and the integrity of sealing is further increased, and wherein the seals extend to an underside of the gate, and further wherein the entirety of the seals of the upstream face are spaced-apart from the entirety of the seals of the downstream face.

2. A resilient seated gate valve for mounting in a pipeline, the gate valve comprising a valve body and a gate mounted in the valve body so as to be movable between an open position, and a closed position where a valve opening formed in the valve body is closed by the gate, the gate being coated with or formed from a resiliently deformable material, the gate comprising two opposed faces spaced from the transverse plane of the gate, at least the upstream face being provided with at least two seals of the resiliently deformable material that each extend around the face, the at least two seals comprising a first upstream seal and a second upstream seal, the first upstream seal being located within the periphery of the second upstream seal such that both seals, when the gate is in the closed position, seal against a seat of the valve body to seal the valve opening against the pressure of fluid acting on the gate in use, the first upstream seal, in use, permitting fluid leakage when it reaches the limit of its sealing capability for a given compression such that an inter-seal space between the first and second upstream seals becomes pressurised so that the fluid pressure is stepped and retained across the seals, that is, the fluid pressure between the seals is intermediate the upstream fluid pressure and the downstream fluid pressure, wherein at least four seals are provided, that is, the upstream and the downstream faces each comprise at least two seals, such that in use, the seal compression forces required to seal against a given fluid pressure are further reduced, and the integrity of sealing is further increased, and wherein the seals extend to an underside of the gate, and further wherein the entirety of the seals of the upstream face are spaced-apart from the entirety of the seals of the downstream face around the entirety of the gate.

3. The gate valve of claim 2 wherein each face comprises more than two seals.

4. The gate valve of claim 2 wherein each face comprises an equal number of seals.

5. The gate valve of claim 2 wherein each face is provided with a different number of seals from the other.

6. The gate valve of claim 2 wherein at least one of the seals is of curved profile.

7. The gate valve of any claim 2 wherein a least one of the seals is of angular profile.

8. The gate valve of claim 2 wherein the gate is wedge shaped when viewed from the side, that is, in a direction aligned with the plane of the valve opening.

9. The gate valve of claim 2 wherein the at least two seals extend down the upstream face and underneath the base of the gate, that is, the seals occupy more than one plane when the gate is viewed from the side.

10. The gate valve of claim 2, wherein the entirety of the at least two seals of the upstream face are located on the upstream face and on a base of the gate.

11. The gate valve of claim 2, wherein the entirety of the at least two seals of the downstream face are located on the downstream face and on a base of the gate.

12. The gate valve of claim 2, wherein the inter-seal space between the two seals of the upstream face is continuous.

13. The gate valve of claim 12, wherein an inter-seal space between the two seals of the downstream face is continuous.

14. The gate valve of claim 13, wherein the entirety of the inter-seal space between the seals of the upstream face is spaced-apart from the entirety of the inter-seal space between the seals of the downstream face.

15. The gate valve of claim 1, wherein the at least two seals of the downstream face comprise a first downstream seal and a second downstream seal.

16. The gate valve of claim 15, wherein an inter-seal space between the second upstream seal and the second downstream seal is continuous.

17. The gate valve of claim 1, wherein the entirety of the at least two seals of the upstream face are spaced from the transverse plane.

18. The gate valve of claim 17, wherein the entirety of the at least two seals of the downstream face are spaced from the transverse plane.

* * * * *